E. W. BIGELOW.
Gridiron.
No. 77,349.
Patented April 28, 1868.
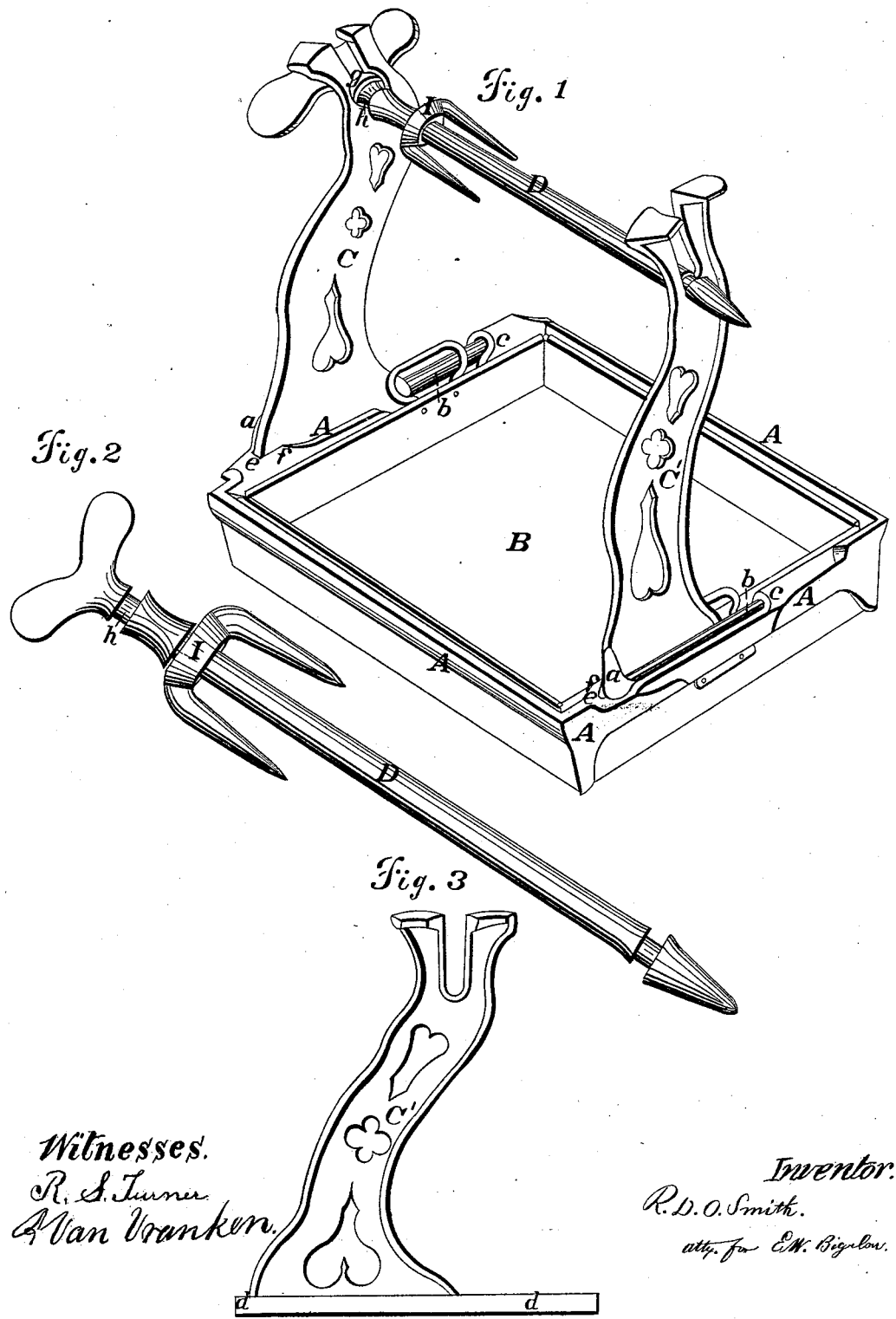
Witnesses:
R. S. Turner
A. Van Vranken
Inventor:
R. D. O. Smith.
atty. for E. W. Bigelow.

United States Patent Office.

ELIJAH W. BIGELOW, OF WORCESTER, MASSACHUSETTS.

Letters Patent No. 77,349, dated April 28, 1868.

SPIT FOR ROASTING MEATS.

The Schedule referred to in these Letters Patent and making part of the same.

TO ALL WHOM IT MAY CONCERN:

Be it known that I, ELIJAH W. BIGELOW, of Worcester, in the county of Worcester, and State of Massachusetts, have invented a new and useful Improvement in Spits for Roasting Meat; and I do hereby declare the following to be a full, clear, and exact description of the same, reference being had to the accompanying drawings, in which—

Figure 1 is a perspective view of my apparatus.
Figure 2 exhibits the spit detached.
Figure 3 exhibits one of the standards detached.

My invention relates to an improvement in the apparatus used in roasting meat, and in order that others may understand the construction and operation of the same, I will proceed to particularly describe it.

A, fig. 1, is a frame, made of iron, of the proper size and shape to retain the dripping-pan B. Around the upper edge of this frame is a space fitted to receive the upper edge of the pan B, so that it may rest upon it. At two opposite sides of this frame A, the upper edge is extended above the pan, and so turned as to form a seat and joint for the standards C C, which support the spit D. There is also a lug, $a$, projecting upward from the edge of the frame, on the outside of the standards, which serves to retain the same in their position when properly placed.

The standards C C are made of iron, in the form shown in fig. 3, the lower part being a cylindrical rod, $b$, fitting into its seat in the frame A, which has a space allowing of some motion to the part $b$.

In order to place the standards in proper position, it is only necessary to enter the end, $b$, in the opening at $c$, and slide it along until the end, $d$, will enter the opening at $e$, which done, insert it as far as allowed, and the lug $a$ on one side, and the edge of the flange at $f$, will retain the standards in a vertical position.

At the top of each standard is a slot, opening upwards, to receive and retain the spit D. The standard C has a slot of different form from the one in C', as shown in fig. 1, the lower part being square, and having above that a larger circular portion, $g$.

The spit D has, at the part which rests in the slot of the standard C, a square section, $h$, fig. 2, which fits into the lower part of the slot, and is thereby prevented from turning. When it is desired to turn the spit, the handle is raised a little, and then it is free to turn around, and can be placed in either of four different positions, as desired.

The spit has attached to it, and sliding upon it, a fork, I, which serves to fasten the meat to be roasted, so that it will turn with the spit.

This device is applicable to the ovens of common stoves, and when used, will prevent the meat which is being roated from contact with the gravy during the process of cooking, thus securing freedom from the objectionable stewing in fat which the lower portions of the meat are subjected to in the ordinary mode of roasting in a stove-oven.

Having thus described my invention, what I claim is—

1. The frame A, with standards C C', constructed as described, so as to receive the dripping-pan B, and support the spit D, for the purpose set forth.

2. The spit D, provided with the rectangular portion $h$, in combination with the slot $i$, of proper size to fit said rectangular portion, as set forth.

3. The detachable standards C C', constructed as described, in combination with the lugs $a$ $a$, as and for the purpose set forth.

ELIJAH W. BIGELOW.

Witnesses:
   GEORGE W. LEWIN,
   W. J. EDDY.